(12) United States Patent
Minassa et al.

(10) Patent No.: US 11,732,577 B2
(45) Date of Patent: Aug. 22, 2023

(54) DOWNHOLE MULTIPLEXED ELECTRICAL SYSTEM

(71) Applicant: Halliburton Energy Services, Inc., Houston, TX (US)

(72) Inventors: Lorenzzo Breda Minassa, Tomball, TX (US); Aswin Balasubramanian, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/303,311

(22) Filed: May 26, 2021

(65) Prior Publication Data

US 2022/0381141 A1 Dec. 1, 2022

(51) Int. Cl.
| | | |
|---|---|---|
| *E21B 47/12* | (2012.01) | |
| *E21B 17/02* | (2006.01) | |
| *H04B 3/36* | (2006.01) | |
| *G01V 11/00* | (2006.01) | |

(52) U.S. Cl.
CPC ............ *E21B 47/12* (2013.01); *E21B 17/028* (2013.01); *G01V 11/002* (2013.01); *H04B 3/36* (2013.01)

(58) Field of Classification Search
CPC ..... E21B 47/12; E21B 17/028; G01V 11/002; H04B 3/36
See application file for complete search history.

(56) References Cited

U.S. PATENT DOCUMENTS

| | | | |
|---|---|---|---|
| 4,019,148 A | 4/1977 | Shawhan | |
| 8,322,446 B2 | 12/2012 | Smithson et al. | |
| 8,476,786 B2 | 7/2013 | Shaw | |
| 8,590,609 B2 | 11/2013 | Smithson et al. | |
| 8,636,054 B2 | 1/2014 | Smithson et al. | |
| 8,757,278 B2 | 6/2014 | Smithson | |
| 10,287,851 B2 | 5/2019 | El Mallawany | |

(Continued)

FOREIGN PATENT DOCUMENTS

| | | |
|---|---|---|
| WO | 2010030422 A9 | 3/2010 |
| WO | 2010030648 A1 | 3/2010 |

(Continued)

OTHER PUBLICATIONS

"SmartPlex Downhole Control System", Halliburton Completion Tools, 2015, 2 pages.

(Continued)

*Primary Examiner* — Brad Harcourt
(74) *Attorney, Agent, or Firm* — Delizio, Peacock, Lewin & Guerra

(57) ABSTRACT

A control module for operation of downhole well tools and apparatuses is disclosed. The control module can control multiple tools, electronics, subs, etc. based on one electronic input and optionally one hydraulic input from the wellhead or surface. The control module can transmit along selected electronic lines and optionally hydraulic lines in order to control specific apparatuses of the downhole well tools. By allowing a single electronic line from the surface or shut in to control multiple tools, total electronic complexity is reduced. A three conductor control module can control operations of up to twelve downhole tools, and a two conductor control module can control operations of up to six downhole tools, in some embodiments.

15 Claims, 7 Drawing Sheets

(56) References Cited

U.S. PATENT DOCUMENTS

| | | | |
|---|---|---|---|
| 10,612,344 | B2 | 4/2020 | El Mallawany et al. |
| 2010/0085210 | A1 | 4/2010 | Bonavides et al. |
| 2010/0237698 | A1 | 9/2010 | Smithson |
| 2011/0210609 | A1* | 9/2011 | Smithson ............... E21B 23/00 307/38 |
| 2017/0022766 | A1* | 1/2017 | Dong ..................... H02J 4/00 |
| 2017/0104329 | A1* | 4/2017 | Boe ....................... H02M 5/40 |
| 2017/0331280 | A1* | 11/2017 | Koenecke ............... H02H 7/20 |
| 2019/0017368 | A1 | 1/2019 | El Mallawany |
| 2019/0390536 | A1 | 12/2019 | Archibald et al. |

FOREIGN PATENT DOCUMENTS

| | | |
|---|---|---|
| WO | 2011162919 A1 | 12/2011 |
| WO | 2013126039 A1 | 8/2013 |
| WO | 2017116381 A1 | 7/2017 |
| WO | 2017123202 A1 | 7/2017 |
| WO | 2018056991 A1 | 3/2018 |
| WO | 2019164476 A1 | 8/2019 |

OTHER PUBLICATIONS

Pallanich, "Smart Tools for Zonal Control", Upstream Technology, 2016, p. 56-57.
"PCT Application No. PCT/US2021/070617, International Search Report and Written Opinon", dated Feb. 18, 2022, 11 pages.

* cited by examiner

DOWNHOLE MULTIPLEXED ELECTRICAL SYSTEM

TECHNICAL FIELD

The disclosure generally relates to the field of earth or rock drilling and more particularly to transmitting measuring-signals or control signals from the well to the surface, or from the surface to the well.

BACKGROUND

It is useful to be able to selectively actuate well tools in a subterranean well. For example, production flow from each of multiple zones of a reservoir can be individually regulated by using a remotely controllable downhole tool, e.g., a choke or valve, for each respective zone. The downhole tool can be interconnected in a tubing string, e.g., a production or completion string, so that, by varying the setting of each downhole tool, the proportion of production flow entering the tubing string from each zone can be maintained or adjusted as desired.

However, the operation and systems for carrying this out can be quite complex in actual practice. In order to be able to individually actuate multiple downhole tools, a relatively large number of wires, lines, etc. have to be installed and/or complex wireless telemetry and downhole power systems often need to be utilized. Indeed, each of these scenarios can involve use of relatively unreliable downhole electronics and/or the extending and sealing of many lines through bulkheads, packers, hangers, wellheads, etc.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to downhole subs disposed on or coupled to production tubing in illustrative examples. Embodiments of this disclosure can be also applied to other downhole tubulars or devices, e.g., those coupled directly to casing. In other instances, well-known instruction instances, protocols, structures and techniques have not been shown in detail in order not to obfuscate the description.

Overview

In completion, e.g., a permanent completion, various downhole well tools can be disposed in the wellbore, e.g., to control flow of wellbore fluids in the wellbore from various zones to maximize production and/or control for water flooding, etc. It is desirable to be able to control a multiplicity of downhole well tools from the surface via electrical connections thereto. The downhole tools can be solely electric (e.g., for all electric systems) or can be hydroelectric (e.g., having both electrical and hydraulic lines running thereto. To minimize the amount of downhole electronics and to minimize electrical lines penetrating the wellhead, a system can have a single conductor running through the wellhead from the surface to a first downhole tubular, e.g., a disconnect tool of a lower completion, the first downhole tubular including a control module that multiplexes the single conductor to two or more conductors. For example, with three conductor system running from the control module at least twelve different downhole tools can be controlled independently. Likewise, one of the three lines can again be multiplexed with a duplicate of the control module to control more downhole tools.

Example Illustrations

Figure 1:
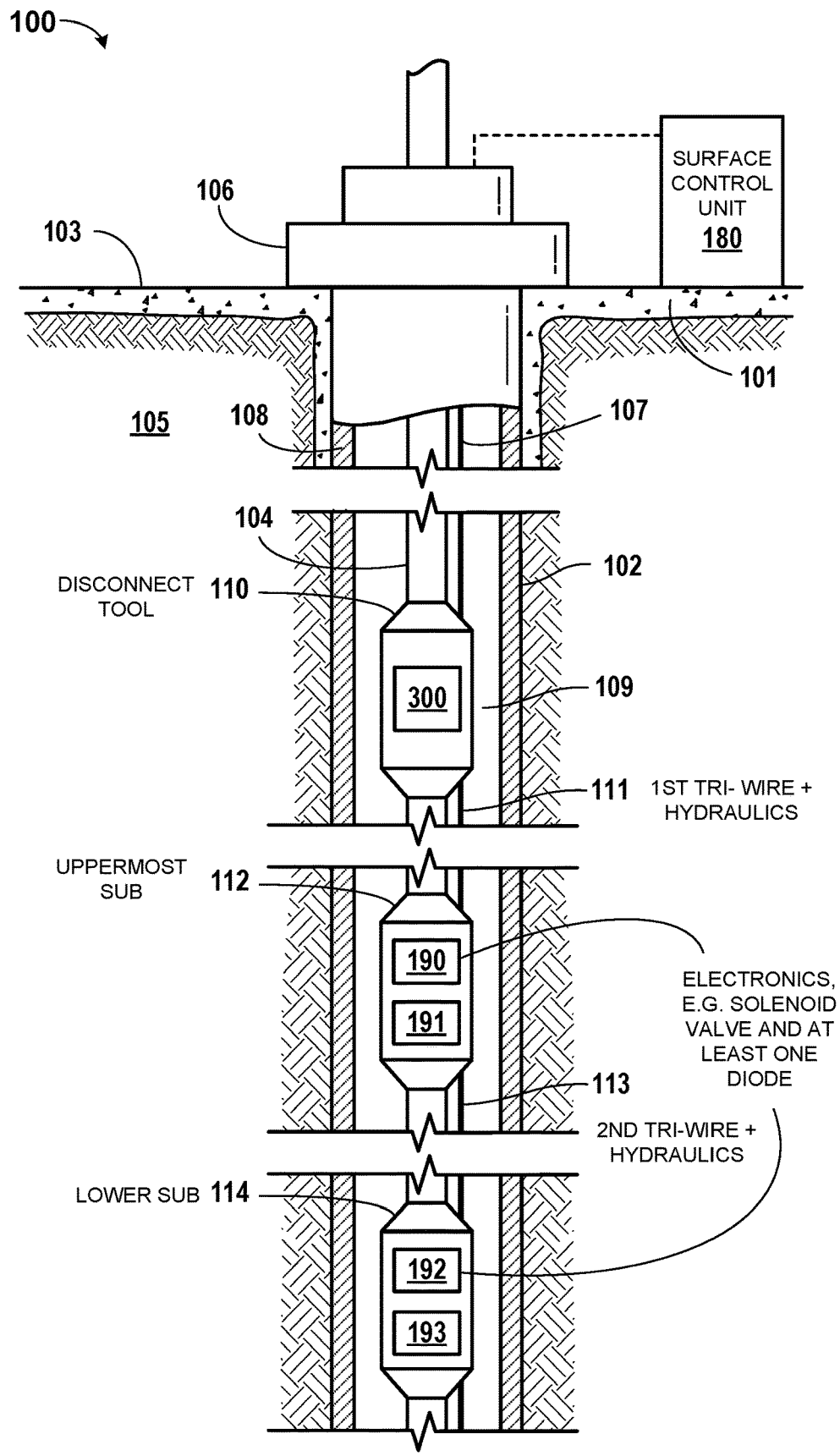
FIG. 1 depicts a partial cross-sectional view of a well completion, according to one or more embodiments.

FIG. 1 depicts a partial cross-sectional view of a well completion 100, according to one or more embodiments. The well completion 100 includes a wellbore 102 extending through, i.e., formed in, a subterranean formation 105 from a wellhead 106 located at surface 103 (i.e., the earth's surface). Although not depicted as such, the wellhead 106 could be a subsea wellhead located where the wellbore intersects a sea floor. The wellbore 102 includes a casing string 108. The casing string 108 can be at least partially cemented into the subterranean formation, e.g., via one or one or more layers of cement 101. Although cement 101 is shown near the surface 103, in one or more embodiments cement can extend the length of the wellbore 102. Although the wellbore 102 is depicted as a single vertical wellbore, other implementations are possible. For example, the wellbore 102 can include one or more deviated or horizontal portions. Although only one casing string 108 is shown, multiple casing strings may be radially and/or circumferentially disposed around casing string 108.

A production or tubing string 104 is positioned in the wellbore 102 inside the casing string 108, forming an annulus 109 between the tubing string 104 and the casing string 108. One or more downhole tubular, e.g., one or more completion subs (three are shown: a disconnect tool 110, an upper or first sub 112, and a lower or second sub 114) are included in (or physically coupled to) the tubing string 104. Both the downhole tubulars and the tubing string 104 collectively (possibly with other subs and joined tubing) make up the production tubing of the well completion 100.

A control line 107 extends from the surface 103 of the wellbore 102 to the disconnect tool 110. The control line 107 can supply power and/or communication via one or more electrical lines (e.g., via one or more tubing encapsulated conductor (TEC) or "instrument" wire, i.e., "i-wire") and, in one or more embodiments, also can provide a hydraulic connection (via one or more hydraulic lines) to the disconnect tool 110. The control line 107 can communicatively couple the disconnect tool 110 to a surface control unit 180 for analyzing data measured by downhole sensors or for actuating a downhole well tool, e.g., one or more flow control device, valve, choke, etc. Further, although not shown, the control line 107 can be hydraulically coupled to one or more hydraulic system (e.g., one or more pump, manifold, or the like). For example, the control line 107 can include one or more hydraulic lines that are coupled to a hydraulic system located at the surface 103. In one or more embodiments, the control line 107 includes two or more hydraulic lines that are coupled to a surface hydraulic system.

One or more connectors can couple (e.g., electrically, communicatively, and/or hydraulically) the disconnect tool 110 to the upper and lower subs. For example, as depicted, a first connector 111 couples the first sub 112 to the disconnect tool 110 and a second connector 113 couples the second sub 114 to the first sub 112. In one or more embodiments, the first connector 111 and/or the second connector 113 are hydraulically coupled to control line 107. For example, the first connector 111 and/or the second connector 113 can include one or more hydraulic lines that are coupled to one or more hydraulic lines of the control line 107. In one or more embodiments, the first connector 111 and the second connector 113 each include two or more hydraulic lines such that a first hydraulic line of first connector 111 is hydraulicly coupled to a first hydraulic line of the second connector 113, a second hydraulic line of first connector 111 is hydraulicly coupled to a second hydraulic line of the second connector 113, and both the first and second hydraulic lines of each connector (e.g., the first connector 111, the second connector 113) are hydraulically coupled to a first and second hydraulic line, respectively, of the control line 107.

The disconnect tool 110 can include a first control module 300 (described infra) that facilitates control of downhole well tools via the surface control unit 180, the control line 107, and at least one of the first connector 111 and the second connector 113. In one or more embodiments, the disconnect tool 110 is (or includes) the uppermost portion of a lower completion and facilitates removal of an upper completion from the lower completion without destructive and/or mechanical intervention. This can allow the lower completion, which may include packers, valves, sensors, or the like, to remain fixed in the wellbore 102. In one or more embodiments, the disconnect tool 110 can hydraulically charge or discharge one or more hydraulic lines of each connector (for example the first connector 111 and the second connector 113), such as to facilitate connection or disconnection of portions of the completion (such as the disconnect tool 110 and the uppermost sub 112), to facilitate deployment or removal of packers, etc.

In one or more embodiments, the uppermost sub (i.e., the first sub 112) and any lower subs (e.g., the second sub 114) include electronics and a downhole well tool. The downhole well tool can include one or more flow control device (e.g., an inflow control device (ICV),) one or more valves (e.g., a solenoid valve (SOV), a gas lift valve, chemical injection valve, circulating valve, reversing valve, or the like), one or more chokes, etc.). In one or more embodiments, the downhole well tool is electrically powered and/or activated. For example, the downhole well tool can include one or more electrically powered or electrically powered device (e.g., an SOV). The first sub 112 is depicted with first electronics 190 and a first downhole well tool 191. The second sub 114 is depicted with second electronics 192 and a second downhole well tool 193. Other subs, e.g., lower subs, can be included having similar electronics and/or downhole well tools. Each of the downhole well tools (e.g., the first downhole well tool 191 and/or the second downhole well tool 193) can be electrically powered, e.g., via isolated power.

Figure 2:
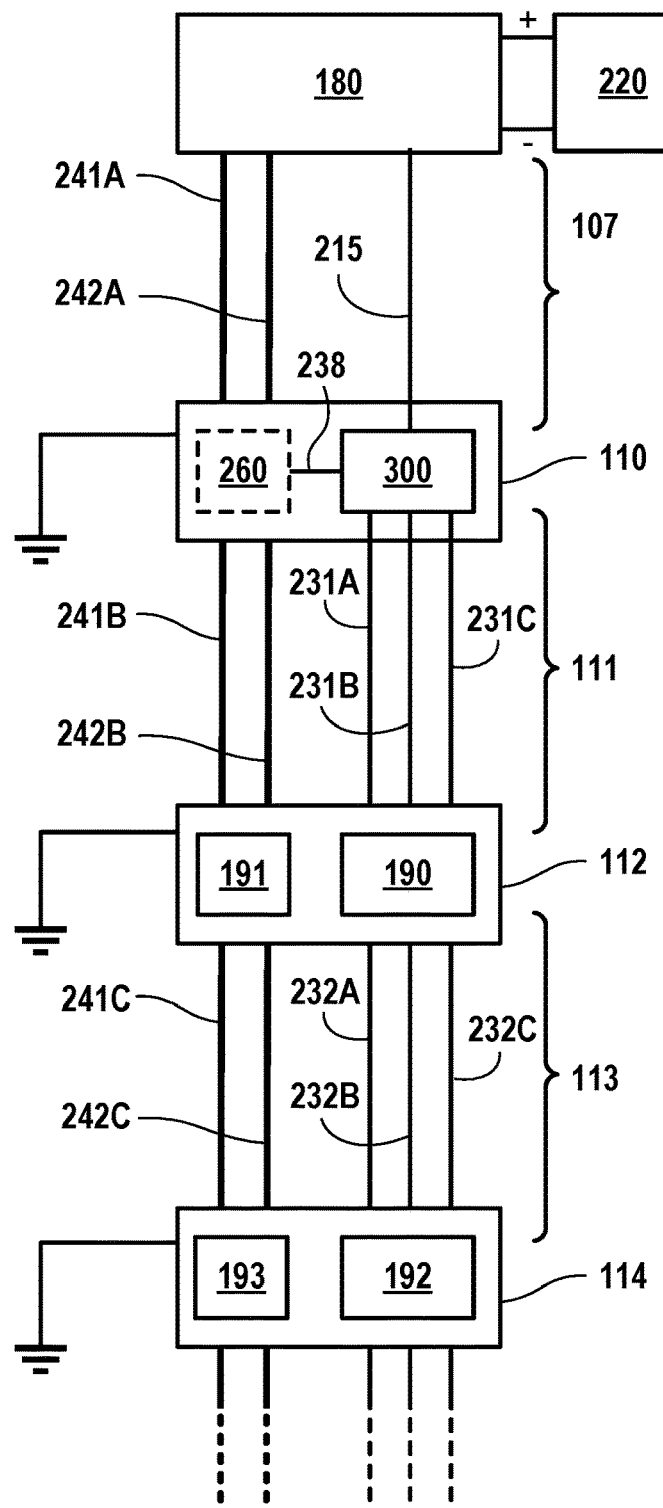
FIG. 2 depicts a schematic of an electro-hydraulic completion system, according to one or more embodiments.

FIG. 2 depicts a schematic of an electro-hydraulic completion system 200, according to one or more embodiments. The electro-hydraulic completion system 200 depicts the connection of electric and hydraulic components of the well completion 100 (see FIG. 1). In one or more embodiments, the control line 107 extending from the surface control unit 180 to the disconnect tool 110 comprises one or more hydraulic lines (two are shown: a first hydraulic line 241A and a second hydraulic line 242A) and a single conductor 215. In one or more embodiments, the single conductor 215 can couple into the disconnect tool 110 via a wet connect connection or other electrical connection. Running a single conductor from the surface can greatly simplify design requirements, as this can be the longest distance for running power and communication in the well completion 100, e.g., longer than running power and communication to upper and lower subs. Further a single conductor minimizes penetrations at the wellhead. As each penetration is can eventually be a potential leak path, it is advantageous to be able to run a single conductor from the wellhead to the disconnect tool 110.

The disconnect tool 110 includes the first control module 300 and optionally includes one or more gauge or sensor 260. The sensor 260 can be coupled to the first control module 300 via a gauge line 238. In one or more embodiments, the sensor 260 can measure at least one of temperature, pressure, strain, or a combination thereof. For example, the sensor 260 can take measurements in the annulus 109 or in flow within the tubing string 104. Telemetry and power to the sensor 260 can be provided by the single conductor 215 and the first control module 300.

A power supply 220 coupled to the surface control unit 180 can be used as a source of direct current. The power supply 220 could also be a source of alternating current and/or command and control signals, if desired. In one or more embodiments, the power supply 220 comprises a floating power supply, e.g., when the casing string 108 and/or tubing string 104 are used as a conductor in the electro-hydraulic completion system 200.

Both the first connector 111 and the second connector 113 include two or more conductors. In one or more embodiments, the first connector 111 includes three first conductors: a first A-conductor 231A, a first B-conductor 231B, and a first C-conductor 231C, and the second connector 113 also include three conductors: a second A-conductor 232A, a second B-conductor 323B, and a second C-conductor 232C. The first A-conductor 231A is tied, i.e., electrically tied, to the second A-conductor 232A, the first B-conductor 231B is tied to the second B-conductor 323B, and the first C-conductor 231C is tied to the second C-conductor 232C. For example, the first A-conductor 231A and the second A-conductor 232A can act as a single conductor, the first B-conductor 231B and the second B-conductor 323B can act as a single conductor, and the first C-conductor 231C and the second C-conductor 232C can act as a single conductor.

Note, the hydraulic lines used in the electro-hydraulic completion system 200 are representative of one type of fluid pressure source which may be used in keeping with the principles of this disclosure. It should be understood that other fluid pressure sources (such as pressure within a tubing string, pressure in an annulus between tubing and casing strings, pressure in an atmospheric or otherwise pressurized chamber, a downhole pump, etc.), may be used as fluid pressure sources in conjunction with the first electronics 190 and second electronics 192 for supplying pressure to the first downhole well tool 191 and the second downhole well tool 193, respectively. For example, the control line 107, the first connector 111, and the second connector 113 can instead only have electrical lines without hydraulic lines, e.g., as used in an "all-electric" completion. In an all-electric system, the downhole well tools can be actuated without hydraulic power, e.g., with downhole tool that use electric powered motors or the like.

Further, while both FIG. 1 and FIG. 2 depict only two subs below the disconnect tool, the well completion 100 and the electro-hydraulic completion system 200 can include additional subs that are electrically, and optionally also hydraulically, connected with the surface control unit 180 via the disconnect tool 110 and the first control module 300.

Figure 3:
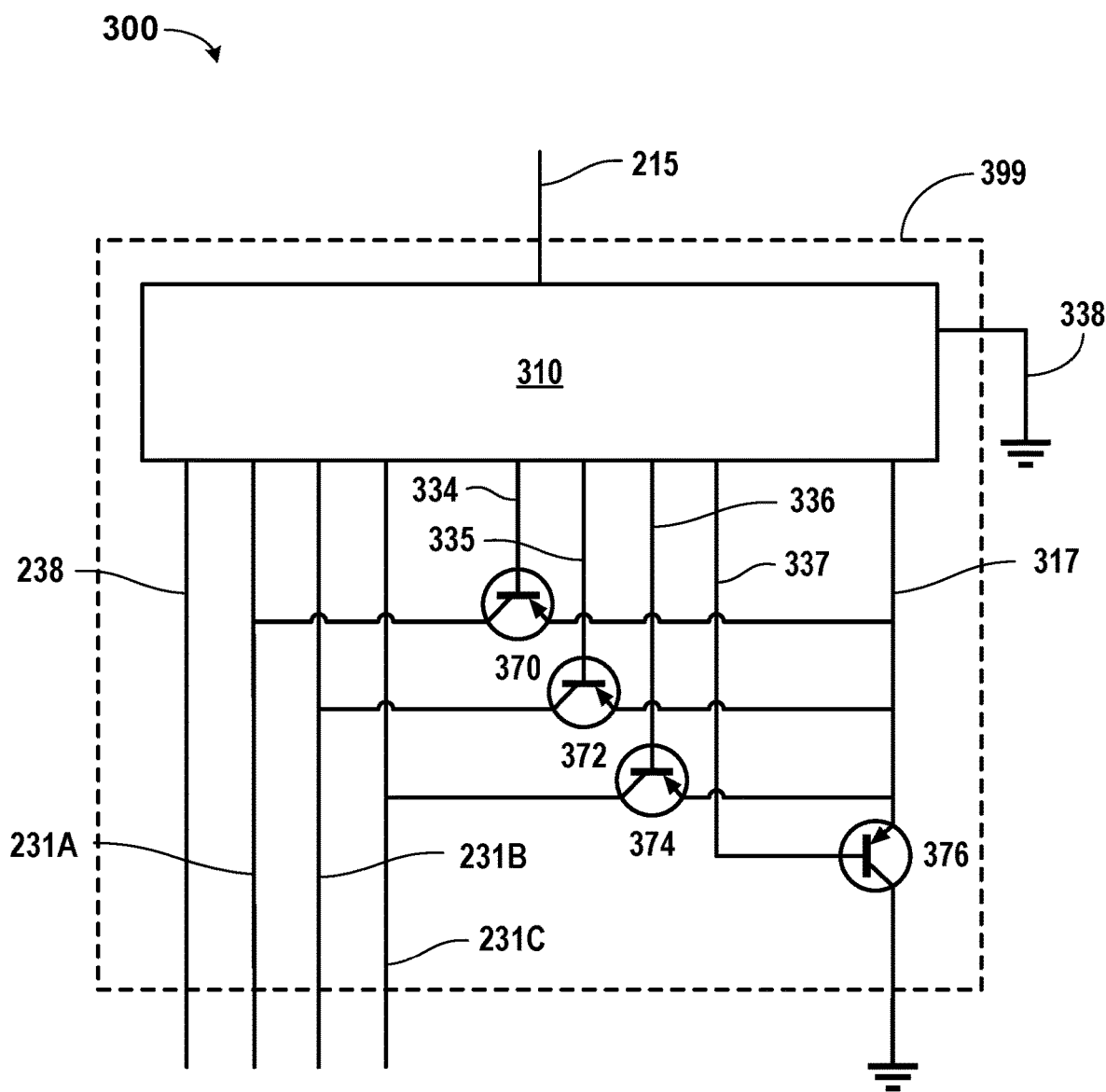
FIG. 3 depicts a schematic of a first control module, according to one or more embodiments.

FIG. 3 depicts a schematic of the first control module 300, according one or more embodiments. In one or more embodiments, the first control module 300 includes a controller 310 and three or more transistors (four transistors are shown: a first transistor 370, a second transistor 372, a third transistor 374, and a fourth transistor 376). While depicted as bipolar junction transistor (BJT) the transistors can be any transistor type, e.g., BJT, field-effect transistors (FET), MOSFET, JFET, MESFET, or the like. Each transistor has three leads. For example, for a BJT these can be a collector, emitter, and a base, and for a MOSFET these can be source, drain, and a gate. The transistors can operate in as n-channel (or electron transport dominant) device or as a p-channel (or hole transport dominant) device. The transistors can operate in depletion or enhancement mode, or any appropriate mode or combination thereof. The first control module 300 further comprises a housing 399. The controller 310, the transistors, and various leads can be enclosed in the housing 399. In one or more embodiments, the housing 399 is couplable to the disconnect tool 110.

The controller 310 can be a processing unit, e.g., a central processing unit (CPU), a logic array, or some other control logic. The controller 310 can be a digital system or analog system. Power and communication from the surface to the controller 310 are provided via the single conductor 215. For example, communication can be provided over power, e.g. by modulating the power signal to encode communication. The controller 310 is also coupled to ground, e.g., to tubing or casing in the wellbore 102 via first ground lead 338.

Three or more conductors (three are shown) extend from the controller 310. As depicted, the first A-conductor 231A, the first B-conductor 231B, and the first C-conductor 231C extend from the controller 310 (and from the first control module 300). Further, the gauge line 238 extends from the controller 310. The gauge line 238 can extend to sensor 260. In addition to controlling applied current and voltage on the conductors (e.g., the first A-conductor 231A, the first B-conductor 231B, and the first C-conductor 231C), the controller 310 can provide power and telemetry (i.e., communication) to the sensor 260 via the single conductor 215. For example, the controller 310 can communicate sensor readings (e.g., temperature, pressure, strain, etc.) to the surface via single conductor 215. Similarly, the controller 310 can control activation or deactivation of the sensor 260.

The first control module 300 also includes a second ground lead 317 and four gate leads: a first gate lead 334, a second gate lead 335, a third gate lead 336, and a fourth gate lead 337. Each gate lead is coupled to the one or more transistors, e.g., to a gate or base thereof. For example, the first gate lead 334 can be coupled to the base or gate (depending of type of transistor) of the first transistor 370, the second gate lead 335 can be coupled to the base or gate (depending of type of transistor) of the second transistor 372, the third gate lead 336 can be coupled to the base or gate (depending of type of transistor) of the third transistor 374, and the fourth gate lead 337 can be coupled to the base or gate (depending of type of transistor) of the fourth transistor 376.

The remaining leads of the first three of the transistors (e.g., source & drain or collector & emitter, depending on the chosen transistor type) are coupled between ground (i.e., via the second ground lead 317) and one of the conductors to effectuate control of the signal on the respective conductor by providing a specific ground path. For example, the first transistor 370 can be coupled between the second ground lead 317 and the first A-conductor 231A to effectuate control of the signal on the first A-conductor 231A, the second transistor 372 can be coupled between the second ground lead 317 and the first B-conductor 231B to effectuate control of the signal on the first B-conductor 231B, and the third transistor 374 can be coupled between the second ground lead 317 and the first C-conductor 231C to effectuate control of the signal on the first C-conductor 231C. The fourth transistor 376 can control the connection of the second ground lead 317 to ground.

Figure 4:
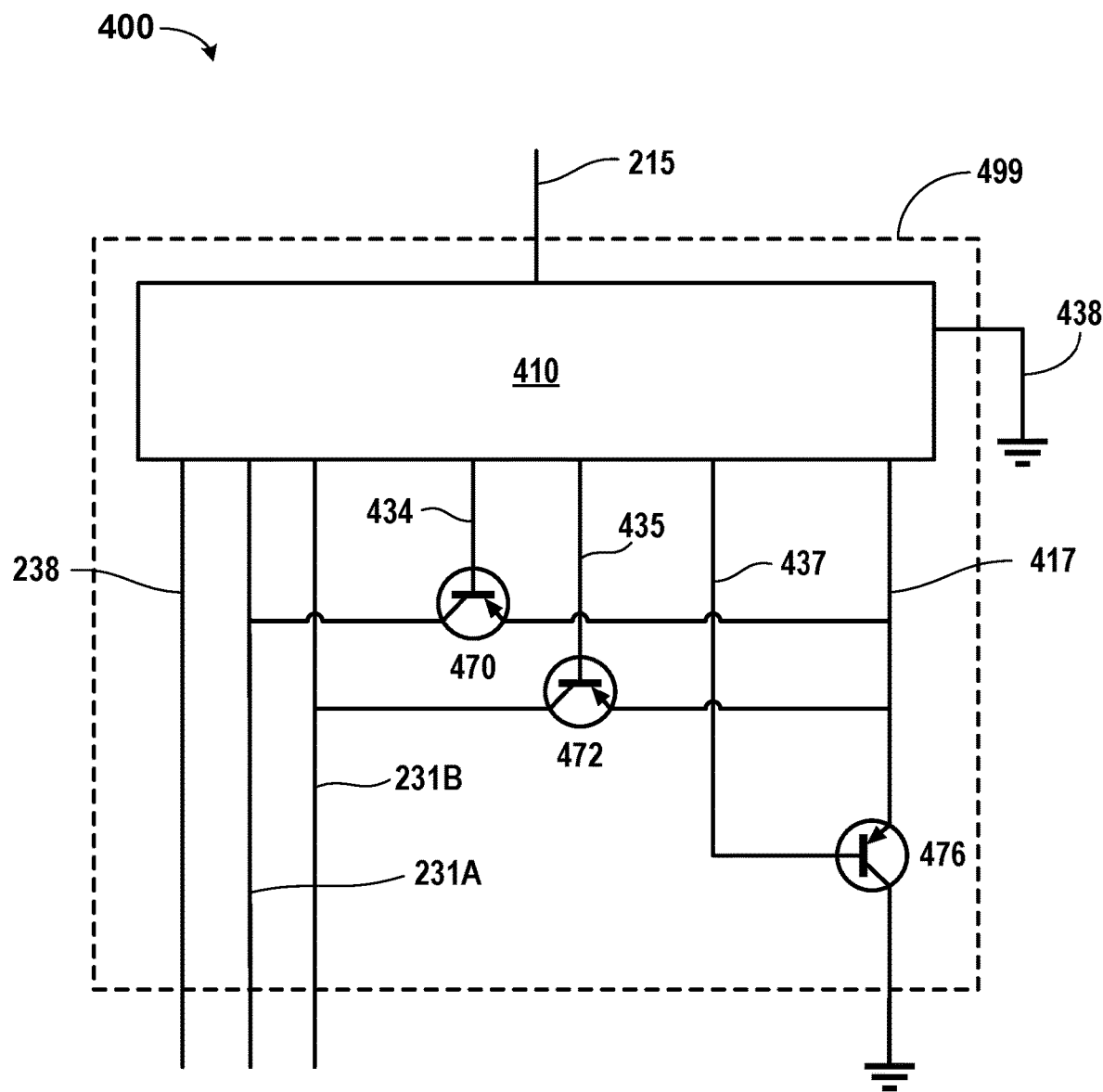
FIG. 4 depicts a schematic of a second control module, according to one or more embodiments.

FIG. 4 depicts a schematic of a second control module 400, according to one or more embodiments. In one or more embodiments, the second control module 400 provides multiplexing of a command from the surface via the single conductor 215 to a two-conductor system extending therefrom (rather than a three-conductor system).

The second control module 400 is similar to the first control module 300, having a second controller 410, but only has two conductors (first A-conductor 231A and first B-conductor 231B) extending therefrom and two or more transistors (only three transistors are shown: a first transistor 470, a second transistor 472, and third transistor 476). The first transistor 470 is coupled to the second controller 410 via a first gate lead 434, the second transistor 472 is coupled to the second controller 410 via a second gate lead 435, and the third transistor 476 is coupled to a third gate lead 437.

The remaining leads of the first two of the transistors (e.g., source & drain or collector & emitter, depending on the chosen transistor type) are coupled between ground (i.e., via a second ground lead 417) and one of the conductors to effectuate control of the signal on the respective conductor. For example, the first transistor 470 can be coupled between the second ground lead 417 and the first A-conductor 231A to effectuate control of the signal on the first A-conductor 231A, and the second transistor 472 can be coupled between the second ground lead 417 and the first B-conductor 231B to effectuate control of the signal on the first B-conductor 231B. The third transistor 476 can control the connection of the second ground lead 417 to ground.

As with the controller 310 the second controller 410 can be a processing unit, e.g., a central processing unit (CPU), a logic array, or some other control logic. The second controller 410 can be a digital system or analog system. Power and communication from the surface to the second controller 410 are provided via the single conductor 215. For example, communication can be provided over power, e.g. by modulating the power signal to encode communication. The second controller 410 is also coupled to ground, e.g., to tubing or casing in the wellbore 102 via a first ground lead 438.

Figure 5:
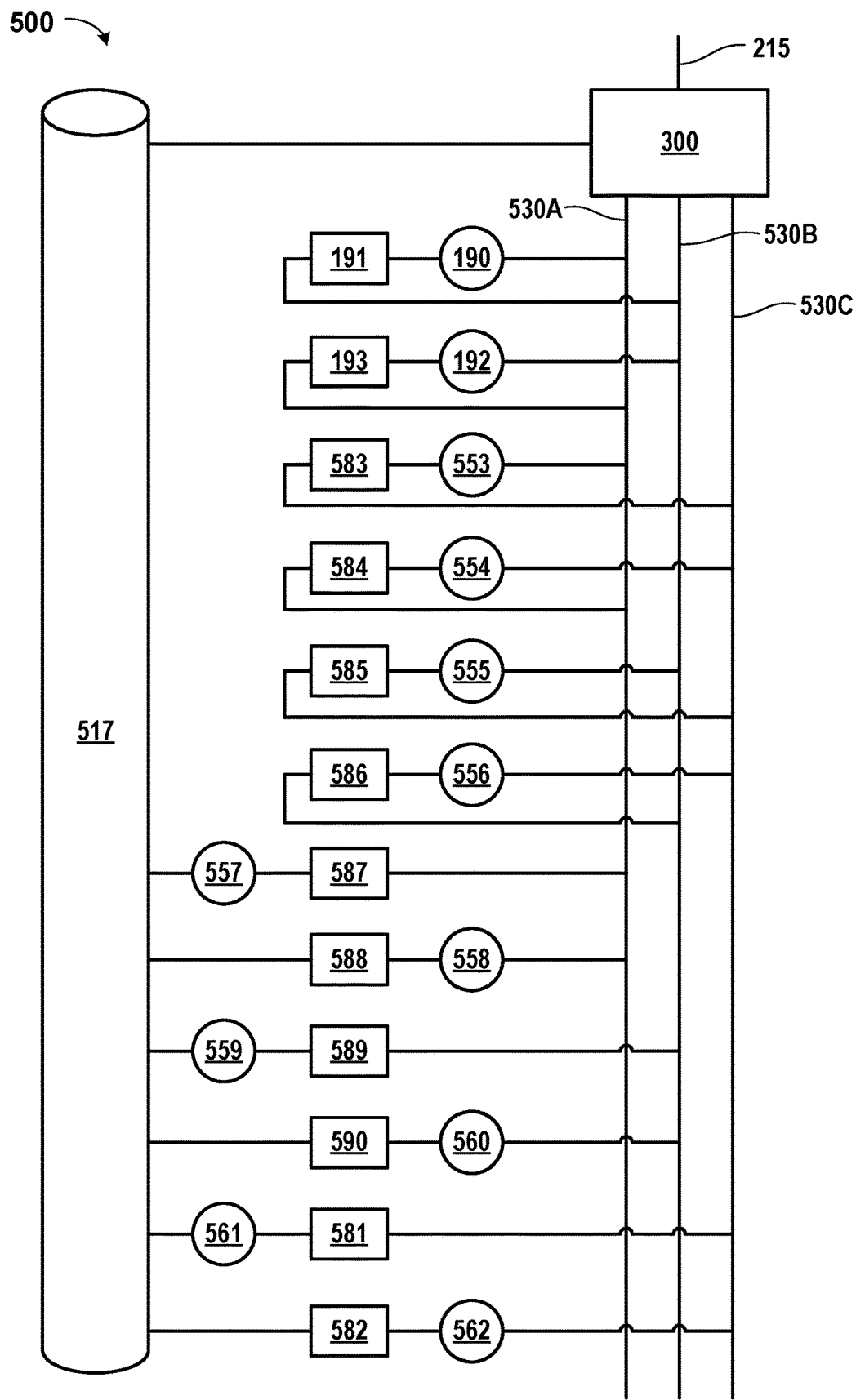
FIG. 5 depicts a flowchart of a method for activating a downhole tool, according to one or more embodiments.

FIG. 5 depicts a schematic of a downhole electrical system 500 for controlling multiple downhole tools, according to one or more embodiments. The downhole electrical system 500 depicts the electrical connections for multiple downhole tools (twelve downhole tools are shown) when two or more conductors extend from the first control module 300 downhole, with the single conductor 215 extending towards the surface of the wellbore.

As depicted, three conductors (A-conductor 530A, B-conductor 530B, and C-conductor 530C) extend from the first control module 300. With the three conductors (e.g., the A-conductor 530A, the B-conductor 530B, and the C-conductor 530C), up to twelve downhole tools can be controlled vie the first control module 300. As will be understood, first control module 300 could be replaced with second control module 400, but only have two conductors extending therefrom. With only two conductors, the second control module 400 would control up to 6 different downhole tools. As will be understood from FIGS. 1-2, the each of the three conductors can be made up of separate conductors coupled together end to end to form a united conductor as shown in FIG. 5. For example, the A-conductor 530A can be a single conductor or can represent a single conductor but actually be formed of 12 or more individual conductors running between each downhole sub and/or each downhole too. The same can apply for the B-conductor 530B and the C-conductor 530C. In one or more embodiments, the A-conductor 530A includes first A-conductor 231A and second A-conductor 232A, B-conductor 530B includes first B-conductor 231B and second B-conductor 232B, and C-conductor 530C includes first C-conductor 231C and second C-conductor 232C.

The downhole well tools depicted include the first downhole well tool 191 and the second downhole well tool 193. In addition, ten other downhole well tools are shown: third downhole well tool 583, fourth downhole well tool 584, fifth downhole well tool 585, sixth downhole well tool 586, seventh downhole well tool 587, eighth downhole well tool 588, ninth downhole well tool 589, tenth downhole well tool 590, eleventh downhole well tool 581, and twelfth downhole well tool 582. Each of the downhole well tools can comprise at least one of a flow control device, a valve, a choke, or the like. Further, in one or more embodiments, each of the downhole well tools includes an electrically powered device (e.g., an SOV). The electrically powered device can be coupled to electronics.

Each of the downhole well tools is coupled to electronics on one side and to either a conductor or ground 517 on another side. Ground 517 can be any ground lead. In one or more embodiments, one or more of the tubulars disposed downhole (e.g., one of casing or production tubing) is used as ground 517. For example, just as the first downhole well tool 191 is coupled to first electronics 190 and the second downhole well tool 193 is coupled to second electronics 192, each of the ten other downhole well tools 581-590 are coupled to downhole electronics. As depicted, the first electronics 190 is coupled to the A-conductor 530A, and the first downhole well tool 191 is coupled between the first electronics 190 and the B-conductor 530B. Similarly, the second electronics 192 is coupled to the B-conductor 530B, and the second downhole well tool 193 is coupled between the second electronics 192 and the A-conductor 530A.

Four more of the downhole well tools are coupled both to downhole electronics on one side and to one of the three conductors 530A-530C (e.g., the A-conductor 530A, the B-conductor 530B, and the C-conductor 530C) on another side as follows: a third electronics 553 is coupled to the A-conductor 530A, and the third downhole well tool 583 is coupled between the third electronics 553 and the C-conductor 530C; a fourth electronics 554 is coupled to the C-conductor 530C, and the fourth downhole well tool 584 is coupled between the fourth electronics 554 and the A-conductor 530A; a fifth electronics 555 is coupled to the B-conductor 530B, and the fifth downhole well tool 585 is coupled between the fifth electronics 555 and the C-conductor 530C; and a sixth electronics 556 is coupled to the C-conductor 530C, and the sixth downhole well tool 586 is coupled between the sixth electronics 556 and the B-conductor 530B.

Further, six of the downhole well tools are coupled with their respective electronics between ground 517 and one of the three conductors 530A-530C. As depicted, the seventh downhole well tool 587 is coupled to the A-conductor 530A, and seventh electronics 557 is coupled between ground 517 and the seventh downhole well tool 587; the eighth downhole well tool 588 is coupled to ground 517, and eighth electronics 558 is coupled between the A-conductor 530A and the eighth downhole well tool 588; the ninth downhole well tool 589 is coupled to the B-conductor 530B, and ninth electronics 559 is coupled between ground 517 and the ninth downhole well tool 589; the tenth downhole well tool 590 is coupled to ground 517, and tenth electronics 560 is coupled between the B-conductor 530B and the tenth downhole well tool 590; the eleventh downhole well tool 581 is coupled to the C-conductor 530C, and eleventh electronics 561 is coupled between ground 517 and the eleventh downhole well tool 581; and the twelfth downhole well tool 582 is coupled to ground 517, and the twelfth electronics 562 is coupled between the C-conductor 530C and the twelfth downhole well tool 582.

Each of the downhole electronics (e.g., the first electronics 190, the second electronics 192, the third electronics 553, the fourth electronics 554, the fifth electronics 555, the sixth electronics 556, the seventh electronics 557, the eighth electronics 558, the ninth electronics 559, the tenth electronics 560, the eleventh electronics 561 the twelfth electronics 562, etc., collectively) can be simple electronics, e.g., for controlling timing, directionality, and/or voltage threshold for powering and/or activating the connected downhole well tools, e.g., to one or more electrically powered device included in the downhole well tool. In one or more embodiments, each of the downhole electronics 190, 192, & 553-562 is coupled to a single electrically powered device include in the respective downhole well tool. In one or more embodiments, at least one of the downhole electronics 190, 192, & 553-562 includes a directional element (e.g., a diode) to limit activation of the respective downhole well tool to a single direction of current flowing on a particular conductor. For example, the first electronics 190 can include a first directional element to allow current to flowing in a first direction on A-conductor 530A to power the first downhole well tool 191, and the second electronics 192 can include a second directional element to allow current to flowing in the first direction on the B-conductor 530B. In one or more embodiments, all of the downhole electronics 190, 192, & 553-562 can include a directional element.

Further, in one or more embodiments, at least one of the downhole electronics 190, 192, & 553-562 includes a thyristor (e.g., a silicon diode for alternating current (SIDAC), diode for alternating current (DIAC), or another thyristor type). The thyristor can conduct electrical current only after it receives a voltage greater than its breakover voltage. After the breakover voltage is reached, the thyristor continues to conductor electrical current as long as it continues to receive any voltage, regardless of whether the voltage is above the breakover voltage. The thyristor resets when the voltage drops close to zero and ceases to conduct current. Thus, the thyristors are coupled to respective electrically powered device include in the respective downhole well tool in a way such that the electrically powered device only sees a current when the respective thyristor conducts current. For example, an electrically powered device of a downhole well tool can be coupled in series with a thyristor between two conductors or between one conductor and ground. In one or more embodiments, each thyristor for each of the downhole electronics 190, 192, & 553-562 has a different breakover voltage.

In one or more embodiments, at least one of the downhole electronics 190, 192, & 553-562 includes a voltage delay device. For example, one or more thyristor can be coupled to a voltage delay device. Each voltage delay device can be configured to receive a voltage and apply a voltage to a respective thyristor after a time delay. In one or more embodiments, the voltage delay device is coupled between the respective thyristor and one of the conductors 530A-530C or ground 517. The voltage delay device also or alternatively can be coupled in parallel with the respective thyristor. The voltage delay device may include one or more of a variety of electronic components, such as capacitors, resistors, inductors, transistors, thyristors, or any combination thereof. In one or more embodiments, the voltage delay device includes a circuit or integrated circuit (IC) especially designed for the purpose of delaying voltage to a thyristor. The voltage delay device can be designed to provide a specific amount of time delay. Each of the voltage delay devices can be designed to provide a different time delay when a voltage differential is applied between a one conductor and another detector or between one conductor and ground, thereby causing a connected thyristor to see the voltage at different times. In one or more embodiments, the time delays provided by the voltage delay devices may be on the order of milliseconds.

As such, each downhole well tool can be individually controlled via current applied on one of the three conductors 530A-530C and returned via either one of the three conductors 530A-530C and ground 517. Note, further controllers can be added to either increase the number of downhole tools addressed or to provide system redundancy.

Figure 6:
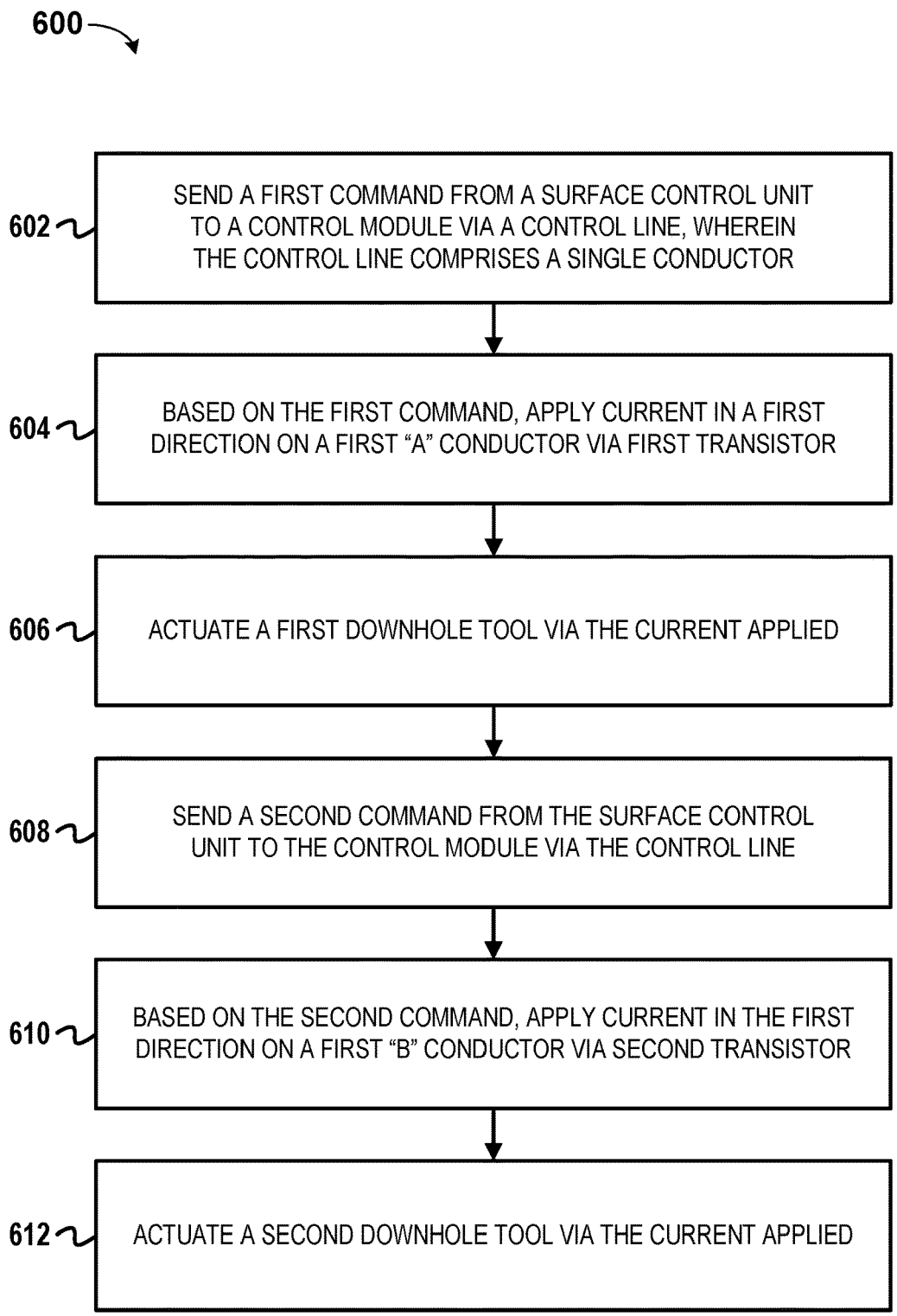
FIG. 6 depicts a flowchart of a method for activating a downhole tool, according to one or more embodiments.

FIG. 6 depicts a flowchart of a method 600 for activating a downhole tool, according to one or more embodiments. In operation, either the first control module 300 or the second control module 400 are used to activate one or more downhole tool (e.g., at least one of the first downhole well tool 191, the second downhole well tool 193, or the like).

At 602, a command is sent from the surface control unit 180 to a control module (e.g., the first control module 300 or the second control module 400) via the control line 107, i.e., via the single conductor 215, in order to actuate a downhole well tool. For example, a first command can be sent from the surface control unit 180 to the control module via the control line 107, i.e., via the single conductor 215, in order to actuate the first downhole well tool 191.

At 604, based on the command, current is applied in a first direction on one conductor via one transistor, and current is returned on another conductor via another transistor. For example, based on a first command, current can be applied on the A-conductor 530A via a first transistor (e.g., the first transistor 370 or the first transistor 470) in a first direction, and current can be returned on the B-conductor 530B via a second transistor (e.g., the second transistor 372 or the second transistor 472) or on the C-conductor 530C via the third transistor 374. In another example, current can be applied on the B-conductor 530B via the second transistor in the first direction, and current can be returned on the A-conductor 530A via the first transistor or on the C-conductor 530C via the third transistor. In yet another example, current can be applied on the C-conductor 530C via the third transistor and be returned on the A-conductor 530A via the first transistor or on the B-conductor 530B via the second transistor.

In one or more embodiments, current is applied in the first direction on one conductor via one transistor and is returned via ground (e.g., via one or more tubulars in the wellbore acting as ground). Similarly, in one or more embodiments, current is applied in a second direction via a transistor and is returned via ground. For example, current can be applied on one of the conductors 530A-530C and return via ground (e.g., via the fourth transistor 376).

The application of current and the direction thereof can be controlled via the controller 310 via one of more of the transistors in the first control module 300. In one or more embodiments, the gate leads (e.g., the first gate lead 334, the second gate lead 335, the third gate lead 336, and the fourth gate lead 337) to each transistor (e.g., the first transistor 370, the second transistor 372, the third transistor 374, and/or the fourth transistor 376) can be used to trigger certain of the transistors and thus control the flow of current, i.e., the applied current, through the transistors and the direction of the current in the conductors and/or ground. For example, to apply current on the first A-conductor 231A (and thus on all of A-conductor 530A), the controller 310 can allow flow of current through the first transistor 370 by application of voltage to the first gate lead 334. Depending on the type and mode of the transistor, the voltage applied to the first gate lead 334 can be positive, negative, or zero to allow current to flow through the first transistor 370. To further allow flow of return current on the first B-conductor 231B (and thus on all of the B-conductor 530B), the controller 310 can allow flow of current through the second transistor 372 by application of voltage to the second gate lead 335, where the voltage of current applied to the second gate lead 335 to allow current flow through the second transistor 372 and on the first B-conductor 231B will depend on the type and mode of the second transistor 372.

At 606, a downhole tool, e.g., one of the downhole well tools such as the first downhole well tool 191, the second downhole well tool 193, 581-583, can be actuated via the current. For example, applying current on the A-conductor 530A (i.e., on the first A-conductor 231A) via the first transistor 370 and returning current on the B-conductor 530B (i.e., on first B-conductor 231B) can actuate first downhole well tool 191 via the first electronics 190. In another example, applying current on the B-conductor 530B (i.e., on first B-conductor 231B) via the first transistor 370 and returning current on the A-conductor 530A (i.e., on the first A-conductor 231A) can actuate the second downhole well tool 193 via the second electronics 192. The downhole well tools 583-586 can be activated similarly via current applied and returned via the appropriate conductor pair per FIG. 5.

For the downhole well tool and electronics coupled in series between ground 517 and the three conductors 530A-530C, the direction of the current applied can determine actuation. For example, the seventh downhole well tool 587 can be actuated via current applied in a first direction on A-conductor 530A, and the eighth downhole well tool 588 can be actuated via current applied in a second direction on A-conductor 530A. Similarly, the ninth downhole well tool 589 can be actuated via current applied in a first direction on B-conductor 530B, the tenth downhole well tool 590 can be actuated via current applied in a second direction on B-conductor 530B, the eleventh downhole well tool 581 can be actuated via current applied in a first direction on C-conductor 530C, and the twelfth downhole well tool 582 can be actuated via current applied in a second direction on C-conductor 530C. In these examples, the current returning via ground will be in a different direction than the direction of the current in applied via one of the conductors. For example, if current is applied via the A-conductor 530A in a first direction (e.g., via the first transistor 370 based on signal from the controller 310 thereto on the first gate lead 334), the current can return in a second direction via ground (e.g., ground 517 or second ground lead 317), e.g., via the fourth transistor 376 based on signal from the controller 310 thereto on the fourth gate lead 337.

The process of actuating (or deactivating) a downhole tool can be repeated by the sending of additional commands from the surface control unit 180. Thus, at 608, a second command is sent from the surface control unit 180 to the control module (e.g. (e.g., the first control module 300 or the second control module 400) via the control line 107, i.e., via the single conductor 215. At 610, based on the second command, current is applied on the first B-conductor 231B (i.e., effectively on all of B-conductor 530B), e.g., in the first direction, via the second transistor 372. At 612, via on the current applied on the first B-conductor 231B, the second downhole well tool 193 can be actuated.

This process can be repeated and/or applied selectively to acuate or deactivate any of the downhole well tools. As such, with at least two conductors and a ground path, up to six downhole tools can be actuated via directing current in one of two directions. Similarly, with at least three conductors and a ground path up to twelve downhole tools can be actuated via directing current in two directions.

Note, FIG. 6 is annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The method flowchart is provided to aid in understanding the illustrations and is not to be used to limit scope of the claims. The flowchart depicts example operations that can vary within the scope of the claims. Additional operations may be performed; fewer operations may be performed; one or more of the operations may be performed in parallel; and the operations may be performed in a different order. For example, the operations depicted in blocks 602-606 can be performed in after blocks 608-612. It will be understood that each block of the flowchart illustration can be implemented by program code. The program code may be provided to one or more processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
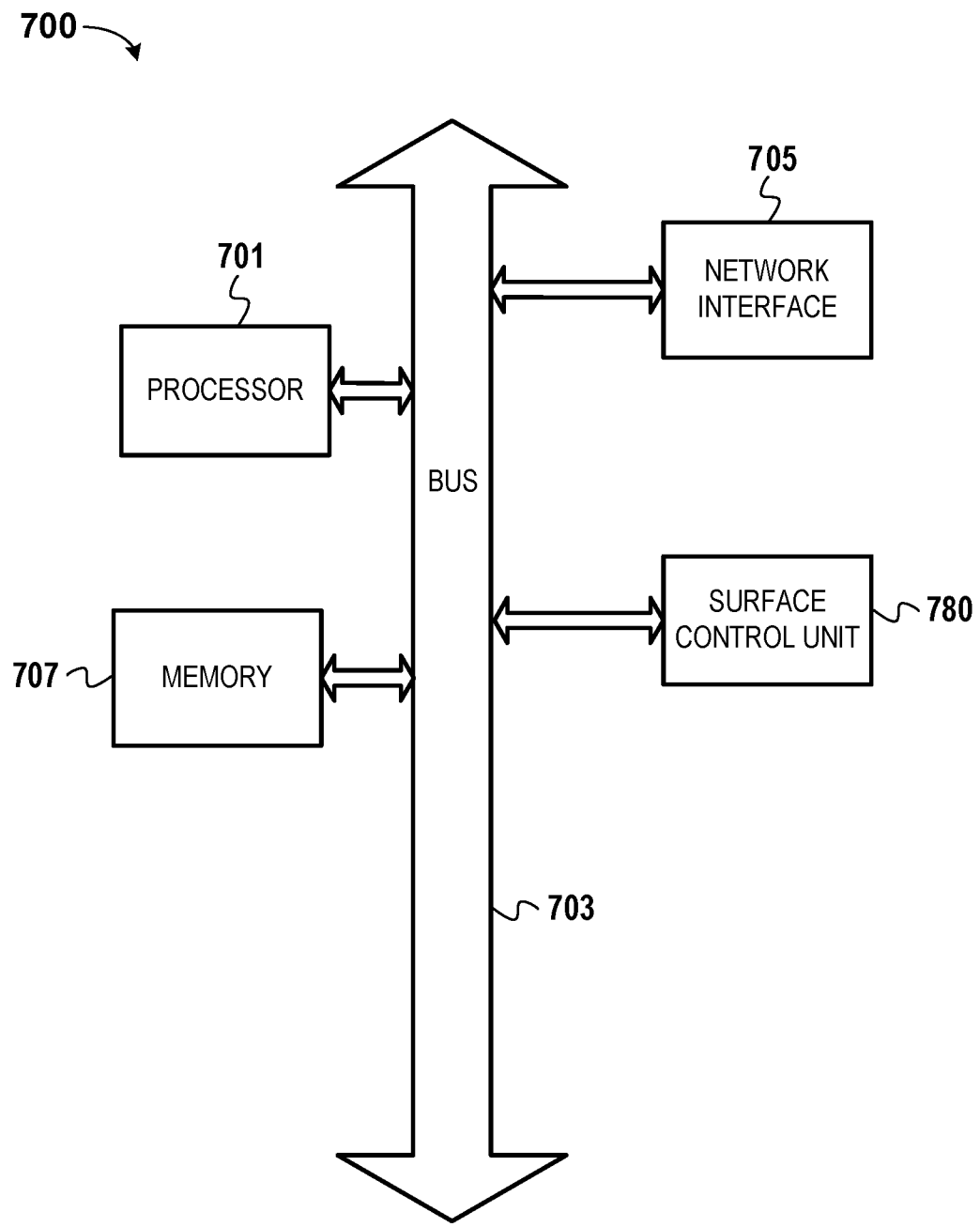
FIG. 7 depicts an example computer system, according to one or more embodiments.

FIG. 7 depicts an example computer system, according to one or more embodiments. A computer system 700 includes a processor 701 (possibly including multiple processors, multiple cores, multiple nodes, and/or implementing multi-threading, etc.). The computer system 700 includes memory 707. The memory 707 may be system memory or any one or more of the above already described possible realizations of machine-readable media. The computer system 700 also includes a bus 703 and a network interface 705. The computer system 700 communicates via transmissions to and/or from remote devices via the network interface 705 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The computer system 700 also includes a surface control unit 780. The surface control unit 780 can be the surface control unit 180 and can work in conjunction with the rest of the computer system 700 to control one or more downhole well tools as described in the examples above. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701 directly.

While the aspects of the disclosure are described with reference to various implementations and exploitations, it will be understood that these aspects are illustrative and that the scope of the claims is not limited to them. In general, techniques for electrically controlling downhole well tools, as described herein, may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise specified, use of the terms "connect," "engage," "couple," "attach," or any other like term describing an interaction between elements is not meant to limit the interaction to direct interaction between the elements and may also include indirect interaction between the elements described. For example, antennas may be coupled inductively without touching one another. Unless otherwise specified, use of the terms "up," "upper," "upward," "up-hole," "upstream," or other like terms shall be construed as generally from the formation toward the surface, e.g., toward wellhead 106 in FIG. 1, or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Numerous examples are provided herein to enhance understanding of the present disclosure. A specific set of example embodiments are provided as follows:

Embodiment 1: A system comprising: a surface control unit; a first downhole tubular comprising a control module, wherein the control module comprises a controller, and wherein the controller comprises three or more transistors; a control line comprising a single conductor, the control line coupled between the surface control unit and the control module; a second downhole tubular comprising a first downhole well tool and first electronics; a first connector coupled between the control module and the first electronics, wherein the first connector comprises two or more first conductors; a third downhole tubular comprising a second downhole well tool and second electronics; and a second connector coupled between the first electronics and the second electronics, wherein the second connector comprises two or more second conductors.

Embodiment 2: The system of embodiment 1, wherein the two or more first conductors are three first conductors, and wherein the two or more second conductors are three second conductors.

Embodiment 3: The system of embodiment 2, wherein the three first conductors comprise a first A-conductor, a first B-conductor, and a first C-conductor, wherein the three second conductors comprise a second A-conductor, a second B-conductor, and a second C-conductor, wherein the first A-conductor is tied to the second A-conductor, wherein the first B-conductor is tied to the second B-conductor, and wherein the first C-conductor is tied to the second C-conductor.

Embodiment 4: The system of any one of embodiments 1 to 3, wherein the first downhole tubular, the second downhole tubular, and the third downhole tubular are disposed in a wellbore.

Embodiment 5: The system of any one of embodiments 1 to 4, wherein the first downhole well tool comprises at least one of a flow control device, a valve, or a choke.

Embodiment 6: The system of any one of embodiments 1 to 5, wherein the first downhole well tool comprises a first electrically powered device, and wherein the first electrically powered device is coupled to the first electronics.

Embodiment 7: The system of embodiment 6, wherein the first electronics comprises a first directional element allowing the first electrically powered device to be powered by current flowing in a first direction in a first A-conductor of the two or more first conductors, wherein the first A-conductor is electrically tied to a second A-conductor of the two or more second conductors, wherein the second downhole well tool comprises a second electrically powered device, wherein the second electrically powered device is coupled to the second electronics, and wherein the second electronics comprises a second directional element allowing the second electrically powered device to be powered by current flowing in second direction in the second A-conductor.

Embodiment 8: The system of embodiment 6 or 7, wherein the first electrically powered device is a solenoid valve (SOV).

Embodiment 9: The system of embodiment 8, wherein the first downhole well tool further comprises a flow control device.

Embodiment 10: The system of any one of embodiments 1 to 9, wherein the control line comprises a first hydraulic line, wherein the first connector comprises a second hydraulic line, wherein the first hydraulic line and the second hydraulic line are hydraulically coupled, and wherein the first downhole well tool is coupled to the second hydraulic line.

Embodiment 11: The system of embodiment 10, wherein the second connector each comprise a third hydraulic line, wherein the first hydraulic line, the second hydraulic line, and third hydraulic line are hydraulically coupled, and wherein the second downhole well tool is coupled to the third hydraulic line.

Embodiment 12: The system of any of embodiments 1 to 11, wherein the first downhole well tool comprises a sensor, wherein telemetry and power to the sensor is provided via the single conductor and the controller.

Embodiment 13: A method comprising: sending a first command from a surface control unit to a control module via a control line, wherein the control line comprises a single conductor, wherein the control module is disposed in a first downhole tubular, wherein the control module comprises a controller, wherein the controller comprises a first transistor and a second transistor, wherein the first downhole tubular is disposed in a wellbore, wherein the first downhole tubular is coupled to a second downhole tubular via a first connector; and wherein the first connector has a first A-conductor and a first B-conductor; based on the first command, applying current in a first direction on the first A-conductor via the first transistor; and actuating a first downhole tool via the current applied, wherein the first downhole tool is coupled to the first downhole tubular.

Embodiment 14: The method of embodiment 13, wherein the first downhole tool comprises an electrically powered device, and wherein actuating the first downhole tool further comprises powering the electrically powered device via the current applied in the first direction on the first A-conductor.

Embodiment 15: The method of embodiment 13 or 14, wherein the first connector has three conductors, and wherein current is applied to at least one of the three conductors based on the first command.

Embodiment 16: The method of any one of embodiments 13 to 15, further comprising returning the current in a second direction via ground.

Embodiment 17: The method of any one of embodiments 13 to 16, further comprising returning the current in a second direction on the first B-conductor via the second transistor.

Embodiment 18: The method of embodiment 17, wherein the first downhole tool is coupled to a second downhole tool via a second connector, wherein the second connector comprises a second A-conductor and a second B-conductor, wherein the second A-conductor is electrically tied to the first A-conductor, and wherein the second B-conductor is electrically tied to the first B-conductor, the method further comprising: sending a second command from the surface control unit to the control module via the control line; based on the second command, applying a second current in the first direction on the first B-conductor via the second transistor; and actuating the second downhole tool via the second current applied in the first direction on the first B-conductor.

Embodiment 19: The method of embodiment 18, wherein the first connector further comprises a first C-conductor, wherein the second connector further comprises a second C-conductor, wherein the second C-conductor is electrically tied to the first C-conductor, and wherein actuating the second downhole tool further comprises returning the second current in the second direction via the first C-conductor and the second C-conductor or via the first A-conductor and the second A-conductor.

Embodiment 20: The method of any one of embodiments 13 to 19, wherein actuating the first downhole tool further comprises charging one or more hydraulic line, wherein the one or more hydraulic line is disposed in the first connector and coupled to the first downhole tool.

The invention claimed is:

1. A system comprising:
a surface control unit;
a first downhole tubular comprising a control module, wherein the control module comprises a controller, a first transistor, and a second transistor;
a control line comprising a single conductor, the control line coupled between the surface control unit and the controller;
a second downhole tubular including a first downhole well tool and first electronics, the first electronics of the second downhole tubular coupled to the first downhole tubular via a first connector, wherein the first connector includes a first A-conductor, a first B-conductor, and a first C-conductor, wherein the controller is configured to control commands to the first connector, and wherein actuation of the first downhole well tool includes,
based on a first command, selection of, with the controller, the first A-conductor and application of a first current in a first direction on the first A-conductor via the first transistor,
actuation of, via the first current, the first downhole well tool, and
return of the first current in a second direction on the first B-conductor via the second transistor;
a third downhole tubular comprising a second downhole well tool and second electronics, the second electronics of the third downhole tubular coupled to the second downhole tubular via a second connector, wherein the second connector includes a second A-conductor electrically coupled with the first A-conductor, a second B-conductor electrically coupled with the first B-conductor, and a second C-conductor electrically coupled with the first C-conductor, and wherein actuation of the second downhole well tool includes,
transmission of a second command from the surface control unit to the control module via the single conductor,
based on the second command, application of a second current in the first direction on the first B-conductor via the second transistor,
actuation of, via the second current, the second downhole well tool, and
return of the second current in the second direction via the first C-conductor and the second C-conductor or via the first A-conductor and the second A-conductor.

2. The system of claim 1, wherein the first downhole tubular, the second downhole tubular, and the third downhole tubular are disposed in a wellbore.

3. The system of claim 1, wherein the first downhole well tool comprises at least one of a flow control device, a valve, or a choke.

4. The system of claim 1, wherein the first downhole well tool comprises a first electrically powered device, and wherein the first electrically powered device is coupled to the first electronics.

5. The system of claim 4, wherein the first electronics comprises a first directional element allowing the first electrically powered device to be powered by current flowing in a first direction in the first A-conductor,
- wherein the second downhole well tool comprises a second electrically powered device,
- wherein the second electrically powered device is coupled to the second electronics, and
- wherein the second electronics comprises a second directional element allowing the second electrically powered device to be powered by current flowing in second direction in the second A-conductor.

6. The system of claim 4, wherein the first electrically powered device is a solenoid valve (SOV).

7. The system of claim 6, wherein the first downhole well tool further comprises a flow control device.

8. The system of claim 1, wherein the control line comprises a first hydraulic line,
- wherein the first connector comprises a second hydraulic line,
- wherein the first hydraulic line and the second hydraulic line are hydraulically coupled, and
- wherein the first downhole well tool is coupled to the second hydraulic line.

9. The system of claim 8, wherein the second connector each comprise a third hydraulic line,
- wherein the first hydraulic line, the second hydraulic line, and third hydraulic line are hydraulically coupled, and
- wherein the second downhole well tool is coupled to the third hydraulic line.

10. The system of claim 1, wherein the first downhole well tool comprises a sensor, wherein telemetry and power to the sensor is provided via the single conductor and the control module.

11. A method comprising:
- sending, via a single conductor, a first command from a surface control unit to a control module disposed in a first downhole tubular in a wellbore, wherein the control module comprises a first transistor, a second transistor, and a controller configured to control commands to a first connector coupled to the first downhole tubular and a second downhole tubular, and wherein the first connector includes a first A-conductor, a first B-conductor, and a first C-conductor;
- based on the first command, selecting, by the controller, the first A-conductor applying a first current in a first direction on the first A-conductor via the first transistor; and
- actuating, via the first current, a first downhole tool coupled to the second downhole tubular;
- returning the first current in a second direction on the first B-conductor via the second transistor;
- sending a second command from the surface control unit to the control module via the single conductor;
- based on the second command, applying a second current in the first direction on the first B-conductor via the second transistor;
- actuating, via the second current, a second downhole tool coupled to a third downhole tubular via a second connector including,
  - a second A-conductor electrically coupled with the first A-conductor,
  - a second B-conductor electrically coupled with the first B-conductor,
  - a second C-conductor electrically coupled with the first C-conductor; and
- returning the second current in the second direction via the first C-conductor and the second C-conductor or via the first A-conductor and the second A-conductor.

12. The method of claim 11, wherein the first downhole tool comprises an electrically powered device, and wherein actuating the first downhole tool further comprises powering the electrically powered device via the first current applied in the first direction on the first A-conductor.

13. The method of claim 11, wherein the first connector has three conductors, and wherein current is applied to at least one of the three conductors based on the first command.

14. The method of claim 11, further comprising returning the first current in a second direction via ground.

15. The method of claim 11, wherein actuating the first downhole tool further comprises charging one or more hydraulic line, wherein the one or more hydraulic line is disposed in the first connector and coupled to the first downhole tool.

* * * * *